United States Patent
Beitscher

(10) Patent No.: US 6,876,383 B1
(45) Date of Patent: Apr. 5, 2005

(54) DIGITAL CAMERA WITH MOVEABLE HIGH RESOLUTION SENSOR ARRAY

(75) Inventor: Warren S Beitscher, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/343,863

(22) Filed: Jun. 30, 1999

(51) Int. Cl.$^7$ .......................... H04N 5/225; H04N 1/46
(52) U.S. Cl. .................... 348/218.1; 358/514; 358/513; 358/482; 358/450
(58) Field of Search .......................... 348/262, 209.99, 348/219.1, 207.99, 218.1; 358/482, 483, 513, 514, 450

(56) References Cited

U.S. PATENT DOCUMENTS

| | | | | |
|---|---|---|---|---|
| 4,579,122 A | * | 4/1986 | Shimizu et al. ............. | 600/445 |
| 5,182,450 A | * | 1/1993 | Pan ............................. | 250/234 |
| 5,721,626 A | * | 2/1998 | Kimura ...................... | 358/482 |
| 5,920,063 A | * | 7/1999 | Kawamoto et al. ....... | 250/208.1 |
| 6,370,339 B1 | * | 4/2002 | Stern et al. ................. | 396/429 |
| 2002/0149679 A1 | * | 10/2002 | Deangelis et al. ..... | 348/207.99 |

FOREIGN PATENT DOCUMENTS

| DE | 4100400 | * | 7/1992 | ........... G03B/17/02 |
|---|---|---|---|---|
| DE | 4100400 A | * | 7/1992 | ........... G03B/17/02 |

* cited by examiner

Primary Examiner—Andrew Christensen
Assistant Examiner—Brian Genco

(57) ABSTRACT

The invention relates to a digital camera which provides high resolution at low cost by using a charge coupled device (CCD) with a high concentration of pixels in one dimension and rapidly scanning an image plane in the camera to provide high resolution in a second dimension. High resolution can thereby be achieved in both dimensions of the image plane without the need for an expensive CCD which employs a two dimensional array of pixels numbering in the thousands in both dimensions. For additional cost savings, the moveable one dimensional CCD concept can be retrofitted into an existing camera assembly thereby replacing the film and film handling equipment in the existing camera.

9 Claims, 3 Drawing Sheets

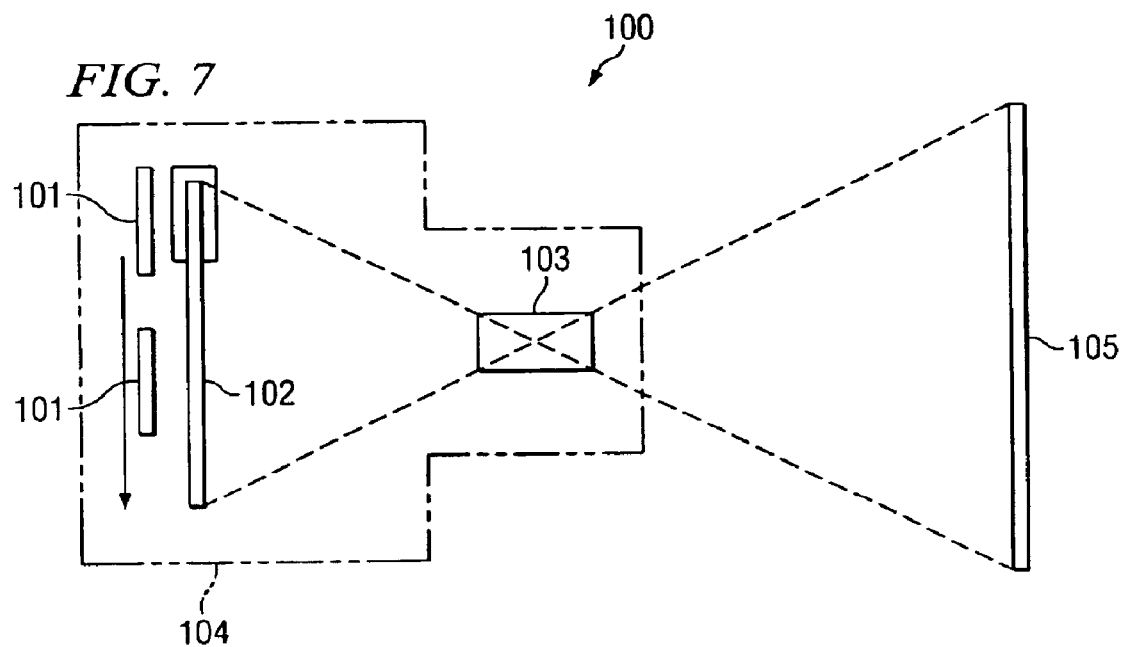
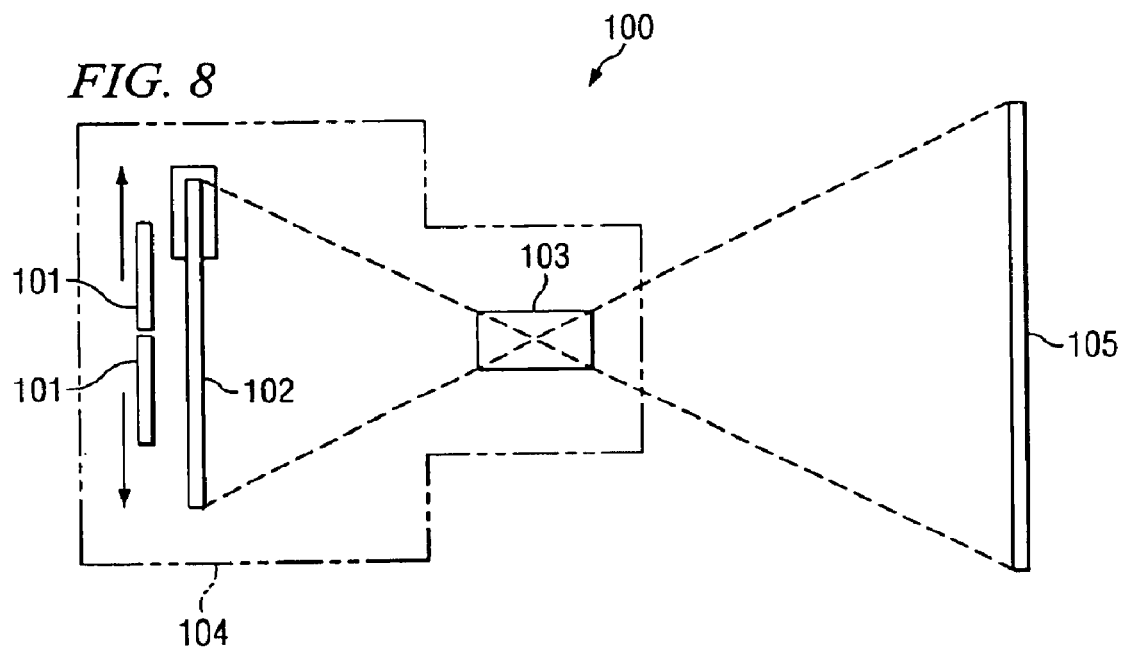

DIGITAL CAMERA WITH MOVEABLE HIGH RESOLUTION SENSOR ARRAY

BACKGROUND

In the field of digital photography, a Charge Coupled Device (CCDs) is frequently used in place of chemical film and acts as the image capturing device. The CCD performs an initial conversion of the incoming image into electronic digital data, and this data is then transmitted to some form of digital storage medium such as a disk or flash card. The data once stored in such a controlled environment can be manipulated, viewed electronically, and/or printed using a traditional computer printer.

Prior art digital cameras typically deploy a static CCD behind the lens and/or other mechanical optical equipment to convert the entire incoming image at once into digital data. The resulting resolution and quality of the digital image depends upon the number of pixels available in each of two dimensions in the CCD. Each pixel in a CCD transmits image information pertaining to a defined and relatively small two dimensional space. For example, a commercially available high quality digital camera may comprise a 3,000 by 2,000 pixel array. In this traditional arrangement, the static CCD occupies the entire image plane of the image being photographed, where the image plane is a two dimensional space inside the camera onto which incoming image light is directed. Although CCDs with several thousand pixels in each of two dimensions produce high resolution images, such CCDs are difficult and very expensive to produce.

Scanners have been used to generate digital image data which can later be used to reproduce an image approaching the original image. Such scanners are typically used to reproduce two dimensional images on paper which are inherently static in nature and typically located in extremely close proximity to the scanning equipment. Scanning static two dimensional images does not place high demands upon image data acquisition velocity since the scanner can spend an essentially unlimited amount of time acquiring as much data as needed to move across the length of the document or other item to be scanned since the image of the object being scanned is not changing with time. Such devices are not suitable for reproducing images which are dynamically changing, or which are remotely located from the scanning mechanism.

Therefore, there is a need in the art for a digital camera which has a CCD which is relatively easy to manufacture.

There is a further need in the art for a digital camera which produces high resolution digital images while being relatively easy and inexpensive to manufacture.

SUMMARY OF THE INVENTION

These and other objects, features and technical advantages are achieved by a system and method which uses a CCD which spans the image plane in one dimension by nature of its fixed physical design with high resolution and moves across the image plane in the other dimension thereby acquiring image information for the entire image plane without incurring the expense of a CCD which occupies the entire two dimensional space of the image plane.

Employing a simplified CCD and moving the CCD across the image plane effectively simulates the effect of using a static CCD which occupies the entire image plane but without incurring the much higher cost of a static CCD which potentially comprises several million pixels. The simplified CCD contemplated by this invention could use a three line CCD having, as an example, 10200 pixels. The reduction factor in the number of required pixels between a traditional digital camera CCD and the CCD in the inventive camera is therefore between one hundred and roughly one thousand, resulting in corresponding reductions in cost and difficulty of manufacture.

A preferred embodiment of the present invention employs a CCD with 10200 pixels of resolution in a first dimension. A high quality prior art digital camera CCD typically enjoys a resolution of 3,000 by 2,000. Therefore, the CCD of the present invention, although simpler and less expensive than CCDs used in prior art digital cameras, actually exceeds the resolution of the prior art cameras in this first dimension.

The effective resolution of the preferred embodiment camera in the second dimension of the image plane depends upon the sampling rate of the preferred embodiment CCD as it moves across the image plane. In this context, "sampling rate" refers to the rate at which the inventive camera can convert incoming light into digital image data and then transmit and store such image data for later processing as it moves across the image plane. Each such digital image sampling is referred to as an image sample. Three such image samples are required at each sampling location, one each for red, green, and blue color components. All three color components are sampled using the CCD. Subsequently, the image, with appropriate coloration, is reconstructed using buffering and memory management.

The digital image resolution along the second dimension will increase with an increasing number of samples taken during the scanning movement. For a constant number of image samples taken while scanning across the image plane, the ability of the camera to accurately acquire image information and to reproduce image information pertaining to a dynamically changing image will improve with increasing scanning speed. Ideally then, both the CCD scanning velocity, and the image sampling rate will be as high as possible to achieve optimal digital photo quality.

Typically, for a square image, a total of about 10200 data samples will be taken by the CCD as it scans across the image plane. This number is arrived at by taking the product of a page width, 8.5 inches, and a commonly available scanning rate over distance of 1200 pixels per inch (8.5*1200=10200). The number can increase as the mechanism package allows.

It is an advantage of the present invention that it is easier to manufacture than prior art digital cameras.

It is a further advantage of the present invention that it is much less expensive to manufacture than prior art digital cameras.

It is a still further advantage of the present invention that higher resolution may be achieved than available in the prior art.

It is a still further advantage of the present invention that the scanning CCD mechanism may be retrofitted into current cameras keeping the same lenses and other equipment in the existing camera thereby permitting still further cost savings to the consumer.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which:

FIG. 7 depicts a CCD sensor arrangement according to a preferred embodiment of the present invention.

FIG. 8 depicts a CCD sensor arrangement according to a preferred embodiment of the present invention.

DETAILED DESCRIPTION

Figure 1:
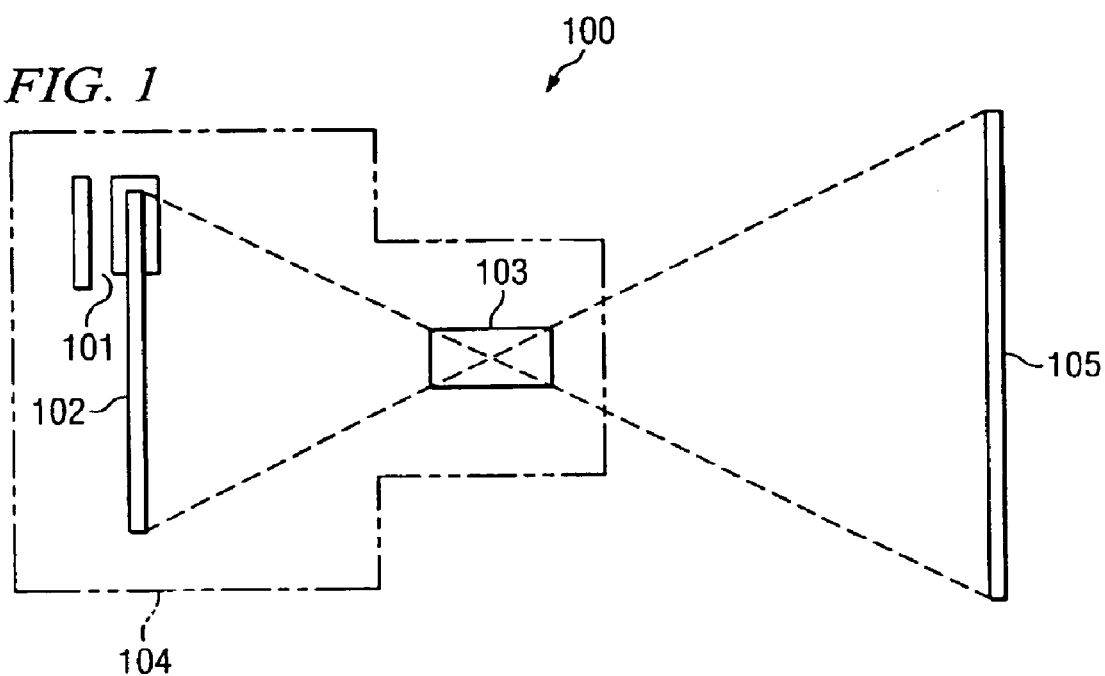
FIG. 1 depicts the general geometrical relationship between an image passing through a traditional lens arrangement towards an image plane to be scanned by a moveable CCD sensor according to a preferred embodiment of the present invention.

FIG. 1 depicts the general geometrical relationship between an image 105 passing through a traditional lens 103 arrangement towards an image plane 102 to be scanned by a moveable CCD assembly or sensor array 101 according to a preferred embodiment of the present invention.

In a preferred embodiment of the present invention, the inventive digital camera 100 receives light from an image 105 through a traditional lens arrangement 103. The image 105 represents the light entering the lens 103 at any moment in time, or alternatively, over a short span of time over which the image information will be recorded and digitized by the inventive camera 100. The image 105 does not represent any fixed point in space, but rather comprises the totality of light arriving at the lens 103 located within an angular range determined by the lens arrangement 103.

In an alternative embodiment, the image may be fed directly into the lens by some active automated source such as a projector, computer graphic display, photographic print, or form of reproduced image.

In a preferred embodiment, the lens 103 comprises a traditional lens arrangement used for handheld cameras. Alternatively, a lens may be employed which is specifically tailored for use with a CCD array, such as by deploying special filters and/or focusing techniques particularly suited for CCD sensors in general, and/or for moving CCD sensors.

In a preferred embodiment of the present invention, the image plane 102 represents a two dimensional space inside the inventive camera 100 body toward which the incoming image data is directed by the lens 103. Preferably, the image plane 102 is flat and rectangular. Alternatively, a variety of two dimensional shapes may be employed for the image plane 102 depending upon the type of lens 103 employed and the shape of the object to be photographed. In yet another alternative embodiment, the image plane may span more than two linear dimensions thereby requiring more complex motion on the part of the moveable CCD assembly 101. Such alternative geometries for the image plane 102 may be useful for certain photographic special effects.

In a preferred embodiment, a CCD sensor assembly 101 is mechanically attached to belt and pulley system driven by a stepper motor for effecting movement of the CCD sensor assembly 101 across the image plane 102. Alternatively, other drive systems may be employed for moving the CCD sensor 101 across the image plane 102. Alternative driving methods include, but are not limited to, deploying electric servo motors, either DC or AC powered, pneumatic drive systems, hydraulic systems, and spring loaded actuation with a manual reset capability, linear actuators, micromachined transducers, and direct drive servo systems. Alternative motion transmission systems include, but are not limited to: chain and sprocket arrangements, rack and pinion motion, linear actuators, and direct drive servo systems. In the cases of active electric, pneumatic, and hydraulic drive systems, appropriate position feedback and control systems may be deployed to control the movement of the CCD sensor 101. Such position feedback and control systems are well known in the art and will not be discussed in detail herein.

In a preferred embodiment, the inventive camera 100 comprises data connections between the moveable CCD sensor 101 and a data storage medium (not shown). This data storage medium could include but is not limited to: a hard disk drive, floppy disk drive, flash card, CD-ROM, computer RAM, Zip drive, and tape drive. Preferably, the moveable CCD sensor transmits data to the selected storage medium as rapidly as possible as it moves across the image frame 102.

In a preferred embodiment, the camera user takes a digital photograph by actuating a switch or button to cause the stepper motor or other movement mechanism to begin moving across the image plane 102 and to initiate data collection and transmission by the CCD sensor. Alternatively, initiation of the image processing could occur by a variety of means including but not limited to: interrupting a light beam, transmission of a signal from a remote source through a wired or wireless connection, via a timing mechanism, voice control, motion sensor and a clock.

In a preferred embodiment, once an instruction to process an image has been received by whatever means, a single CCD sensor 101 which is initially located at one end of the image plane 101 is moved substantially linearly along the image plane until coming to rest at the opposite end of the image plane. Preferably, the CCD sensor processes images and transmits data relating thereto, at evenly spaced distance and time intervals during the CCD sensor's movement across the image plane.

In an alternative embodiment, the processing of images could occur with greater frequency at selected points in time and location within the CCD sensor 101 travel which are arbitrarily selected in advance. For example, it may be desirable to process images with greater resolution and therefore with greater frequency near the center of the image or at other portions of the image which are known in advance. Alternatively, instead of selecting the high frequency/high resolution data collection points in advance, the digital camera may act to increase the processing or sampling frequency in real time based on one or more characteristics of the image as perceived by the inventive device. One such characteristic could be a high rate of change in the nature of the image, as a function of distance, at a particular point in the travel of the sensor across the image plane. Artificial intelligence could be employed to determine which portions of the image warrant more rapid sampling and processing of image data.

The movement of the CCD sensor 101 across the image plane 102 is preferably accomplished as rapidly as possible so as to minimize any change in the image between the points in time at the beginning and at the end of CCD sensor travel. The required velocity for CCD sensor movement will depend in large part on the nature of the image being photographed. The more static the image, the more slowly the CCD sensor may move and accurately reproduce the image. The more dynamically changing the image, the more rapidly the CCD sensor should move to ensure minimal change in the image during CCD sensor movement.

Another variable in the quality of reproduction will be the rate at which the CCD sensor 101 can convert incoming image light into digital data and transmit the image data. The greater the number of samples taken during a single scan of the image plane 102 by the CCD sensor 101, the higher the eventual resolution and quality of image reproduction will be.

In a preferred embodiment of the present invention, the image plane 102 is rectangular, with the rectangle having a long side and short side. One dimension will be spanned by the CCD sensor assembly 101, and the other will be scanned by movement of said CCD sensor assembly 101. Two basic sensor options exist in this case. The first, less expensive option, is to have the sensor span the short dimension and travel the distance of the long dimension. The second, more expensive option, is to have the sensor span the long dimension and travel the length of the short dimension.

The first option is less expensive because the sensor requires fewer pixels to span the shorter dimension. A consequence of this choice is that, for a constant exposure time, the sensor will have to travel more quickly to travel the longer dimension and, assuming a constant sampling rate, will therefore process images at longer distance intervals in comparison with the second option, leading to reduced resolution.

The second option is more expensive because more pixels will be required to cover the longer dimension of the image plane 102. However, the CCD sensor will not have to travel as far to cover the shorter dimension of the image plane 102, and will thereby be able to process images at smaller distance intervals for a constant exposure time, leading to higher resolution over the first option discussed above.

In an alternative embodiment, a plurality of moveable CCD sensors are deployed to more rapidly cover the length of the image plane 102, and to reduce the time delay between the first and last images processed by the CCD sensor 101 in the course of travel across the image plane 102. Preferably, the various sensors are spaced evenly across the dimension of the image plane to be moved along. A variety of different combinations of starting positions and directions of CCD sensor 101 movement across the image plane 101 could be employed without departing from the inventive concept presented herein.

FIG. 7 depicts one alternative embodiment, in which two CCD sensors 101 are deployed, with a first CCD sensor positioned at a first end of the image plane 102 and a second CCD sensor in the middle of the plane 102. They would then both move in the direction of the end of the image plane 102 having no CCD sensor (the second end) and conclude their motion at the same time, with the first CCD sensor 101 located at the center of the image plane 102, and the second CCD sensor located at the second end of the image plane 102. FIG. 8 depicts another alternative embodiment wherein two image sensors could be used both starting at the center of the image plane 102. The two CCD sensors 101 would move in opposite directions, each CCD sensor moving toward one of the two ends of the image plane 102. Employing the latter approach, the images processed first would be those closest to the center of the image plane 102, and the delay in image data acquisition for images acquired by the two CCD sensors would be substantially proportional to the distance from the center of the image plane 102 at which the images were acquired by the two sensors, thereby providing symmetry about the center of the image. It is noted that a variety of different combinations of CCD sensor numbers, starting positions, and directions of CCD sensor travel could be employed without departing from the inventive concepts presented herein.

The embodiments discussed thus far pertain to the use of the inventive camera for still photography. However, in an alternative embodiment, with appropriate control of the rate of movement one or more CCD sensors 101, and appropriate manipulation of image data received from said CCD sensor (s), a continuous live video image stream is achievable. The geometric and chronological resolution of this video image stream would depend upon both the velocity of movement of the CCD sensors and the image processing rate of the CCD sensor(s) and associated digital electronics.

The embodiments discussed thus far assume linear motion of CCD sensor 101 across a rectangular image plane 102. Alternative embodiments include other possible relative motion configurations for moving the CCD sensor with respect to the image plane include, but are not limited to: moving the optical projection of the image with respect to a mostly stationary CCD sensor, employing rotational movement of the CCD sensor with respect to the image plane, and employing a combination of linear and rotational movement of the CCD sensor with respect to the image plane 102. A variety of combinations of relative movement of a CCD sensor with respect to an image plane are possible without departing from the invention described herein.

Figure 2:
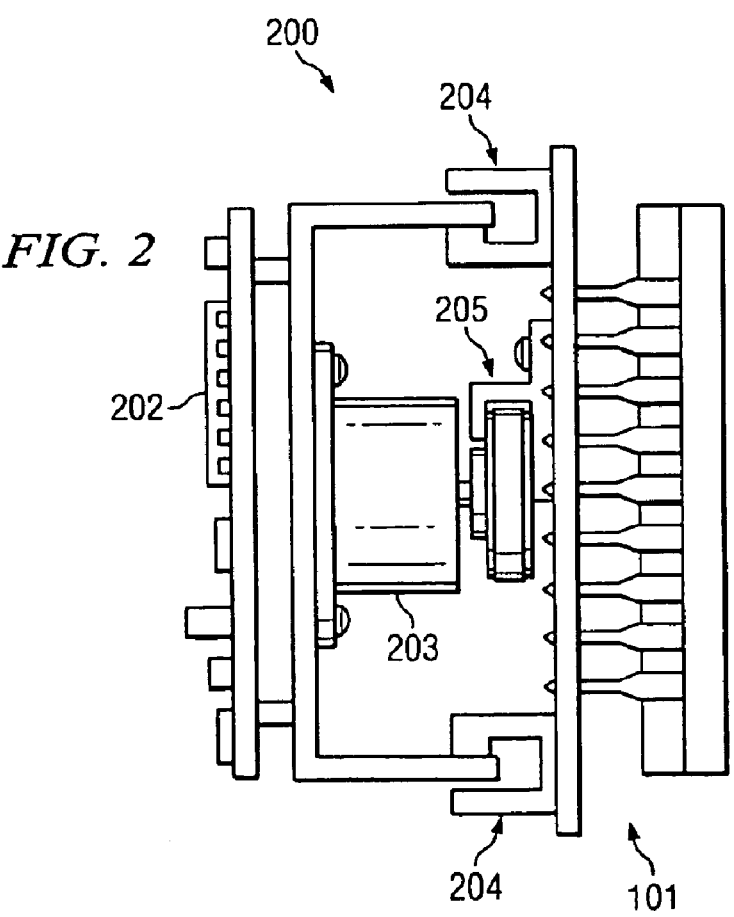
FIG. 2 depicts a scanning mechanism for moving a sensor assembly across an image plane according to a preferred embodiment of the present invention.

FIG. 2 depicts a scanning mechanism 200 for moving a sensor assembly 101 across an image plane 102 (FIG. 1) according to a preferred embodiment of the present invention.

In a preferred embodiment, the scanning mechanism 200 comprises CCD sensor 101 for acquiring image data connected to belt and pulley arrangement 205 for moving the CCD sensor, a stepper motor 203 for rotating the belt and pulley arrangement 205, and a controller electronics board for processing and transmitting acquired image data to a storage device (not shown). Guides 204 help assure that the CCD sensor assembly 101 follows a substantially linear path as it is moved across the image plane 102 (FIG. 1) by the stepper motor 203.

As discussed in connection with FIG. 1, a variety of alternative actuating and transmission systems may be employed to move the CCD sensor assembly 101 across the image plane 102 (FIG. 1). As discussed in connection with FIG. 1, alternatives to the stepper motor include AC or DC servo motors, as well as hydraulic and pneumatic drive systems.

Figure 3:
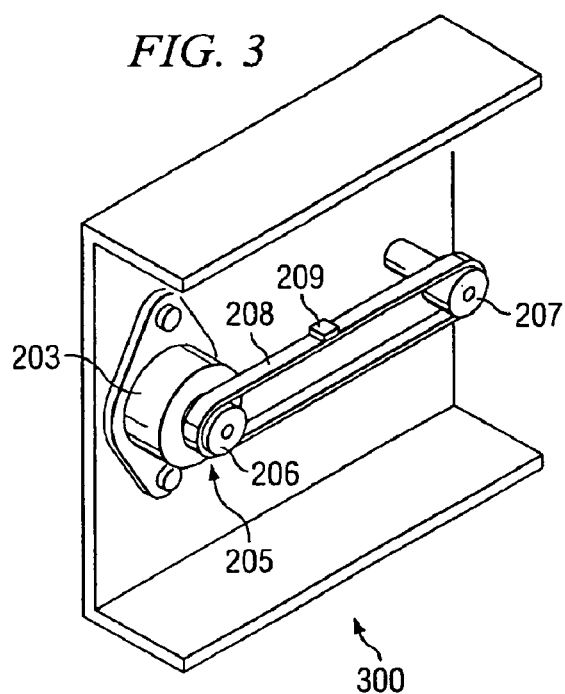
FIG. 3 depicts a belt and pulley system for moving a CCD sensor assembly according to a preferred embodiment of the present invention.

FIG. 3 depicts an actuator mechanism 300 comprising a belt and pulley arrangement 205 for moving a CCD sensor assembly 101 according to a preferred embodiment of the present invention. Stepper motor 203 rotates in response to pulses sent by the controller board 202. Rotation of the stepper motor 203 causes corresponding movement of pulley 206 which is axially attached to the stepper motor, second pulley 207, belt 208, and a notch on the belt 209. The notch 209 on the belt 208 is where the CCD assembly 101 (or, "retina board") is rigidly attached as is shown in FIG. 5.

Figure 4:
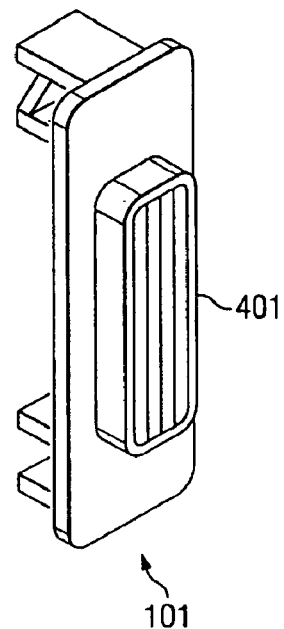
FIG. 4 depicts a CCD sensor assembly according to a preferred embodiment of the present invention.

FIG. 4 depicts a CCD sensor assembly 101 according to a preferred embodiment of the present invention. The CCD sensor 101 preferably comprises CCD sensor 401 which, in turn, preferably comprises a three line sensor arrangement. The three lines referred to comprise one blue line, one red line, and one green line. Each line preferably comprises a single array of pixels evenly distributed along the length of the CCD sensor. Preferably, the three different color pixel lines are employed to resolve color information in the incoming image which is transmitted to the controller board 202 (FIG. 2).

Figure 5:
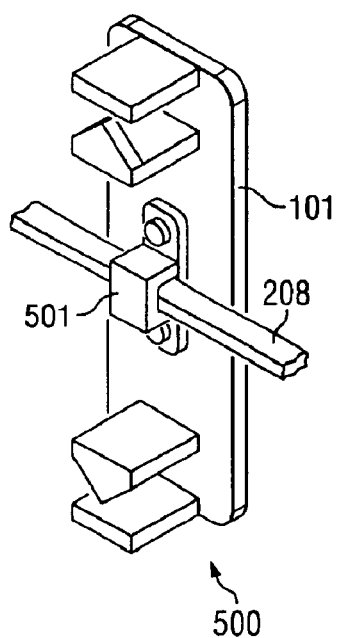
FIG. 5 depicts a back view of the CCD sensor assembly according to a preferred embodiment of the present invention.

FIG. 5 depicts a back view 500 of the CCD sensor assembly 101 according to a preferred embodiment of the present invention. The belt 208 which is part of the belt and pulley system 205 shown in both FIGS. 2 and 3 is shown running through the belt anchor 501 which secures the CCD sensor assembly 101 to the belt. With the CCD sensor assembly 101 securely fastened to the belt 208, the entire CCD sensor assembly 101 will move along with the stepper motor 203 (FIG. 3), pulleys 206 and 207 (FIG. 3), and belt 208. In an alternative preferred embodiment, the belt 208 could be secured to the CCD sensor assembly by various means including but not limited to: clips, clamps, detents, screws and glue.

Figure 6:
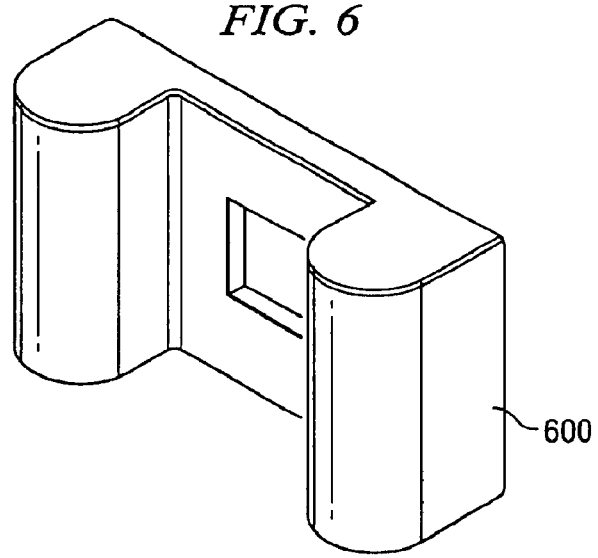
FIG. 6 depicts a conventional camera housing into which a moving CCD sensor mechanism can be retrofitted according to a preferred embodiment of the present invention.

FIG. 6 depicts a conventional camera housing into which a moving CCD sensor assembly 101 can be retrofitted according to a preferred embodiment of the present invention.

Considerably cost savings could be enjoyed by deploying the CCD sensor assembly 101 within an existing camera structure preferably taking advantage of existing lenses and other standard camera mechanical equipment. In a preferred embodiment, the CCD sensor assembly along with scanning mechanism would be substituted for a standard film and reel arrangement within a traditional camera housing. Information from the CCD sensor would be fed out the back of the camera assembly 600 employing either a wired or wireless connection to a digital storage device. Preferably the back of the standard camera assembly would be removed and replaced with an assembly comprising a new camera back plate as shown in FIG. 6 and the CCD sensor assembly.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for generating two dimensional digital image data in a digital camera, the method comprising:

directing light from a source toward an image plane within said digital camera, wherein the image plane having first and second dimensions;

providing a first and a second high resolution sensor array that span the first dimension of the image plane, wherein the first array is located at a one end of said image plane and the second array is located in a middle of said image plane;

moving each sensor array through a portion of the second dimension of the image plane, wherein the moving comprises:

moving the first array and the second array to the direction of the other end of the image plane at the same time; and ceasing moving the first array and the second array when the first array is located in the middle of the image plane and the second array is located at the other end of the image plane;

collecting sampling data samples from the light received by the sensor at a sampling rate; and processing the data samples into the two dimensional digital image data.

2. The method of claim 1, wherein the array has a variable sampling rate.

3. The method of claim 2, further comprising:

changing the sampling rate based upon a characteristic of the two dimensional digital image data.

4. The method of claim 2, further comprising:

increasing the sampling rate to process said image data with increased resolution.

5. The method of claim 2, further comprising:

changing the sampling rate for at least one point along the image plane.

6. The method of claim 1, wherein the sensor array may be moved at a variable velocity.

7. The method of claim 1 wherein said image plane comprise a long dimension and a short dimension wherein said sensor array spans said long dimension and is moved across the length of said short dimension.

8. The method of claim 1 wherein said image plane comprise a long dimension and a short dimension wherein said sensor array spans said short dimension and is moved across the length of said long dimension.

9. A method for generating two dimensional digital image data in a digital camera, the method comprising:

directing light from a source toward an image plane within said digital camera, wherein the image plane having first and second dimensions;

providing a high resolution sensor array which span the first dimension of the image plane, wherein the sensor array may be moved at a variable velocity;

moving the sensor array through a portion of the second dimension of the image plane;

collecting sampling data samples from the light received by the sensor at a sampling rate;

processing the data samples into the two dimensional digital image data; and increasing the variable velocity to accurately process a dynamically changing image.

* * * * *

UNITED STATES PATENT AND TRADEMARK OFFICE
CERTIFICATE OF CORRECTION

PATENT NO. : 6,876,383 B1  Page 1 of 1
APPLICATION NO. : 09/343863
DATED : April 5, 2005
INVENTOR(S) : Warren S Beitscher It is certified that error appears in the above-identified patent and that said Letters Patent is hereby corrected as shown below:

In column 1, line 5, above "BACKGROUND" insert
  -- TECHNICAL FIELD
The invention relates to an improved mechanism for acquiring image information in a digital camera leading to low cost high resolution digital photography. --.

Signed and Sealed this

Twenty-fourth Day of March, 2009

JOHN DOLL
*Acting Director of the United States Patent and Trademark Office*